May 26, 1931.   W. C. YOUNG   1,807,115
FOUR-ROW CORN PLANTER
Filed April 5, 1929   4 Sheets-Sheet 3
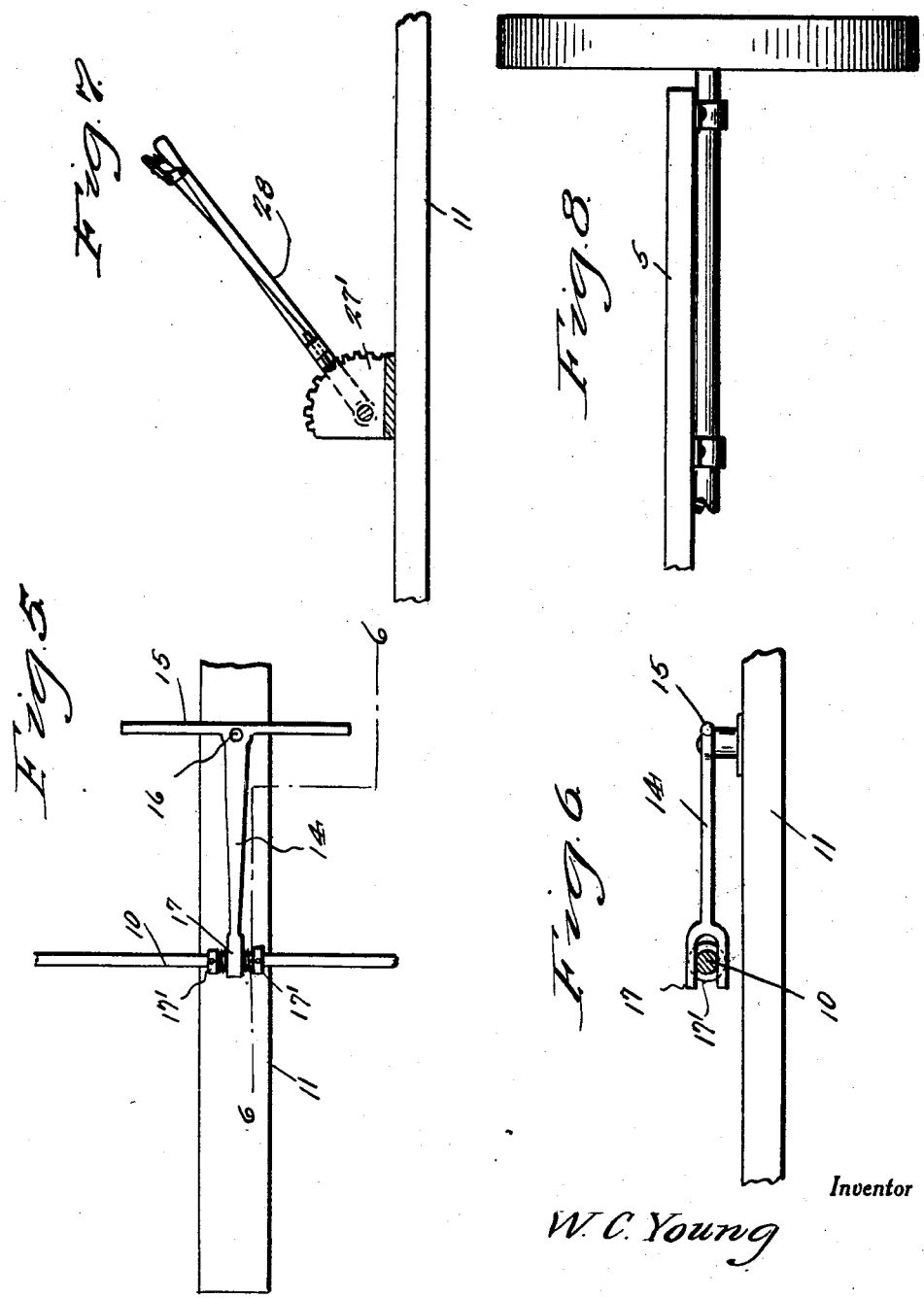
Inventor
W. C. Young
By Clarence A. O'Brien
Attorney May 26, 1931.  W. C. YOUNG  1,807,115
FOUR-ROW CORN PLANTER
Filed April 5, 1929   4 Sheets-Sheet 4
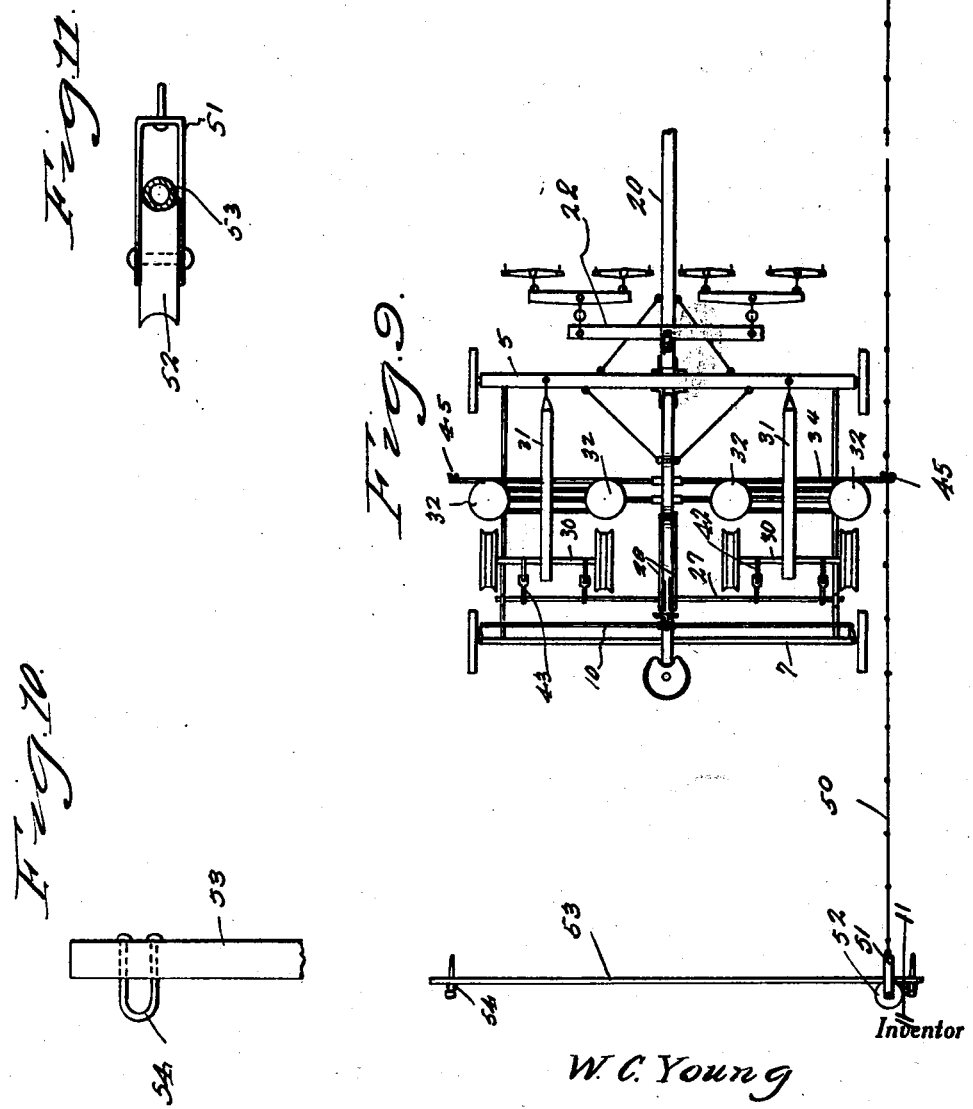
Inventor
W. C. Young
By Clarence A. O'Brien
Attorney Patented May 26, 1931

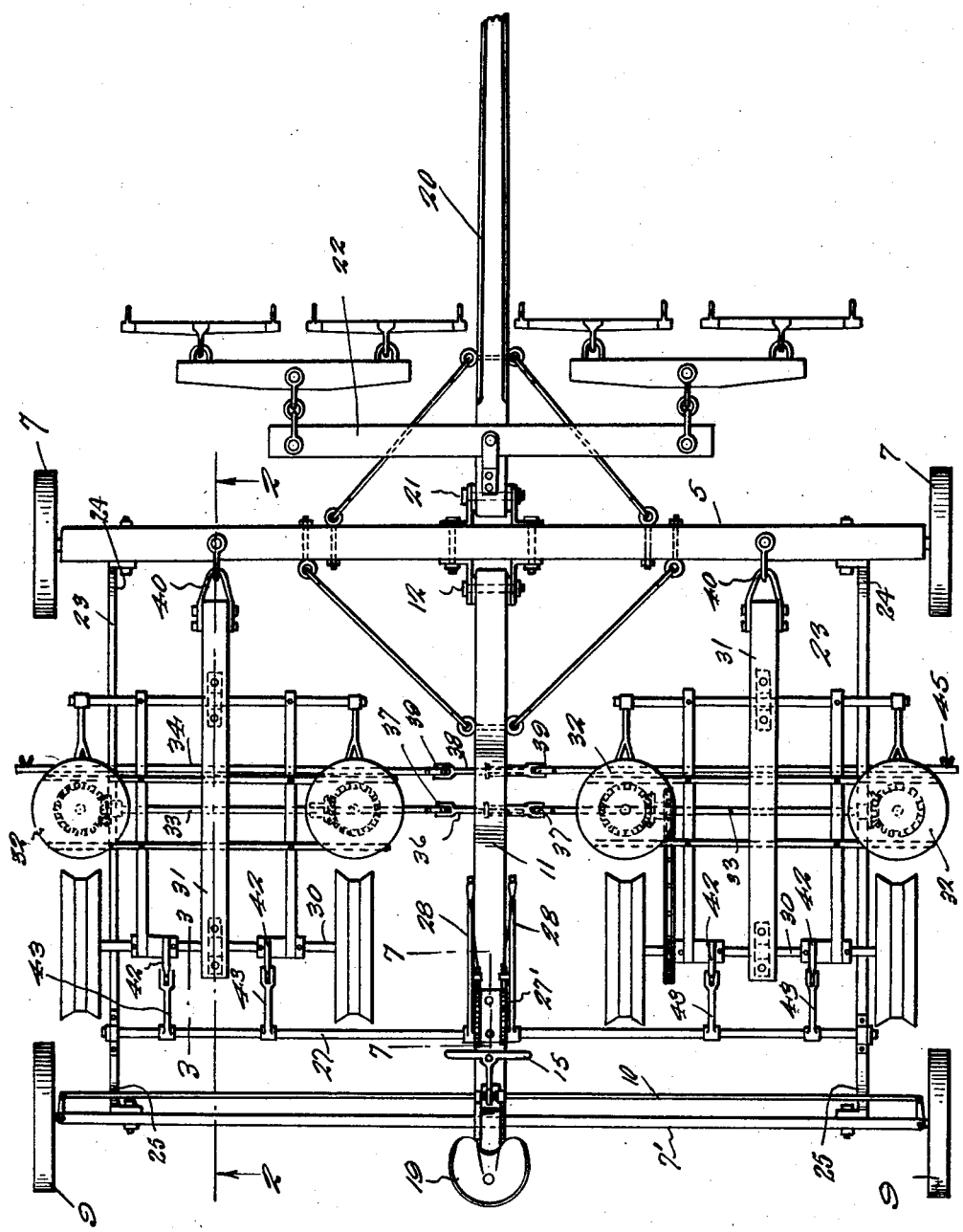

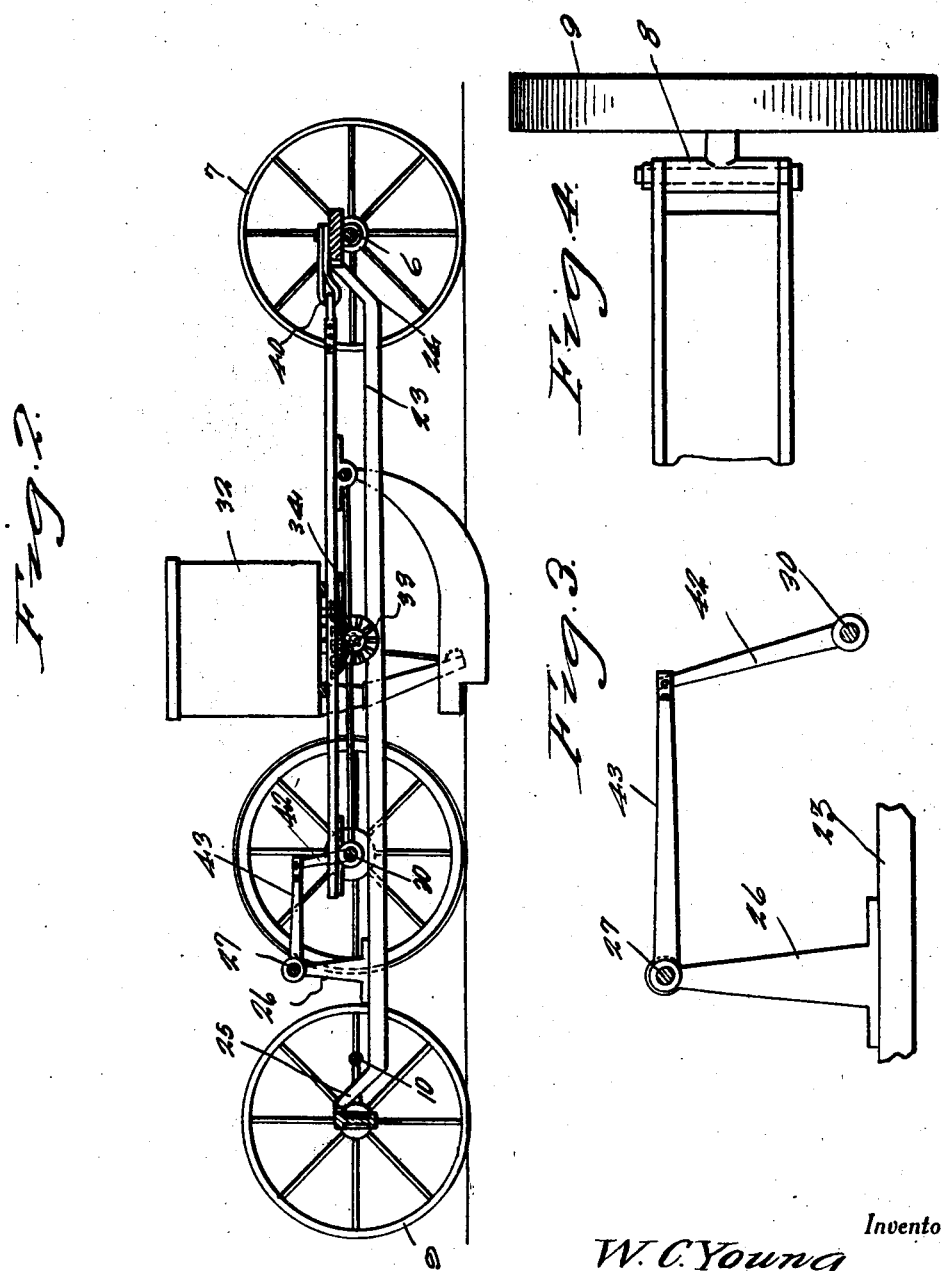

1,807,115

UNITED STATES PATENT OFFICE

WILLIAM C. YOUNG, OF ATLANTIC, IOWA

FOUR ROW CORN PLANTER

Application filed April 5, 1929. Serial No. 352,757.

The present invention relates to a four row corn planter and has for its prime object to provide a main frame in which a pair of two row corn planters may be mounted and tripped from a single trip line.

Another very important object of the invention resides in the provision of means whereby the two row corn planters may be raised so as to be entirely supported by the main frame.

Another very important object of the invention resides in the provision of a four row corn planter of this nature which is simple in its construction, compact and convenient in its arrangement of parts, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the corn planter embodying the features of my invention, Figure 2 is a longitudinal vertical sectional elevational view therethrough taken approximately on the line 2—2 of Figure 1, Figure 3 is a detail sectional view taken substantially on the line 3—3 of Figure 1, Figure 4 is an enlarged detail elevation of one end of the rear axle, Figure 5 is a top plan view of the main central beam showing the steering mechanism, Figure 6 is a sectional view taken substantially on the line 6—6 of Figure 5, Figure 7 is a sectional view taken substantially on the line 7—7 of Figure 1, Figure 8 is an elevation of one end of the front axle structure, Figure 9 is a top plan view of the corn planter machine showing the same associated with the check row trip wire, Figure 10 is an enlarged detail top plan view of one end of the check row wire supporting bar, and Figure 11 is an enlarged detail section taken substantially on the line 11—11 of Figure 9.

Referring to the drawings in detail it will be seen that the numeral 5 denotes a transverse beam with an axle 6 mounted thereunder and having wheels 7 journaled on the ends thereof. The numeral 7' denotes a rear axle with steering knuckles 8 rockably mounted in the ends thereof and having wheels 9 journaled thereon.

The steering knuckles have a tie rod 10 therebetween. A central longitudinal beam 11 has a connection 12 with the center of the transverse beam 5 and extends rearwardly therefrom and is fixed to the center of the axle beam 7'. A T-shaped member includes a longitudinal shank 14 with a cross member 15 and is pivotally mounted as at 16 on the beam 11 and the end of the shank 14 is bifurcated as at 17 to straddle the tie rod 10 between the collars 18.

A seat 19 is mounted on the rear end of the beam 11 so that a person sitting thereon may engage with his feet the cross member 15 and rock the T-shaped member thereby steering the machine as will be apparent. A tongue 20 has a rockable connection 21 with the center of the transverse beam 5 and suitable draft means 22 is associated therewith.

Side bars 23 have upwardly and forwardly inclined ends 24 fixed to the beam 5 and rearwardly and upwardly inclined ends 25 fixed to the beam 7'. Brackets 26 rise from the rear portion of the side bars 23, and brackets 27' rise from the beam 11 and shafts 27 respectively have one end journalled in a bracket 27' and at opposite end journalled in a bracket 26. Levers 28 are mounted on the shafts 27 adjacent the brackets 27'.

A pair of two row corn planters are provided each including a rear axle 30, a central beam 31, a pair of hoppers 32, agitating shafts 33 and trip shafts 34. Otherwise the corn planters may be of conventional construction such as hereinafter modified by the specific features of detail. The shafts 33 are operatively connected together by a shaft segment 36 and having universal connections 37 with the shafts 33.

The shafts 34 are similarly connected together by a shaft segment 38 having universal couplings 39 with the shafts 34. The shaft segments 36 and 38 are of the expansible type, and are located beneath the curved intermediate portion of beam 11 as suggested in Figure 1.

The forward edge of the central beam 31 has a flexible connection 40 with the beam 5. Links 42 are engaged with the rear of the axles 30 and with cranks 43 extending from the shaft 27 so that by rocking the shaft 27 the two row corn planter may be raised from the ground.

The outer ends of the shafts 34 have trip wire engaging means 45 associated therewith. The check row wire is denoted by the numeral 50 attached at its ends to clevises 51 which are journaled pulleys 52 ridable on bars 53 having U-bolts 54 at the ends thereof so that these bars may be supported transversely of the field by means of pegs or the like.

Thus the wire 50 may be used while the machine is going down the field and then may be shifted to the other side of the machine turned around and going up the field. In other words, eight rows of corn may be planted without disturbing the mounting of the wire, to any considerable extent except for shifting it from one end of the bar to the other.

From the above detailed description, it is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a machine of the class described, a main wheeled frame, a pair of two row corn planters mounted in the frame one to each side thereof, means operatively connecting the planting mechanisms of the two row corn planters, and means for raising the two row corn planters from engagement with the ground, rear wheels for the main frame being dirigibly mounted and means for controlling said rear wheels to steer the main frame.

2. In a machine of the class described, a front axle structure, wheels on the front axle structure, a rear axle structure, wheels on the ends of the rear axle structure, side bars between the axle structures, a pair of two row corn planters, means for flexibly engaging the planters with the front axle structure to extend rearwardly therefrom.

3. In a machine of the class described, a front axle structure, wheels on the front axle structure, a rear axle structure, wheels on the end of the rear axle structure, side bars between the axle structures, a pair of two row corn planters, means for flexibly engaging the planters with the front axle structure to extend rearwardly therefrom, a pair of shafts having cranks, means for journalling the shafts between the side bars, means for rocking the shafts, and links extending from the cranks of the shafts to the planters so that by rocking said shafts said planters may be raised from the ground.

4. In a machine of the class described, a front axle structure, wheels on the front axle structure, a rear axle structure, wheels on the ends of the rear axle structure, side bars between the axle structures, a pair of two row corn planters, means for flexibly engaging the planters with the front axle structure to extend rearwardly therefrom, a pair of shafts having cranks, means for journalling the shafts between the side bars, means for rocking the shafts, and links extending from the cranks of the shafts to the planters so that by rocking said shafts said planters may be raised from the ground, means for dirigibly mounting the wheels on the rear axle structure and means for steering said rear wheels.

5. In a machine of the class described, a front axle structure, wheels on the front axle structure, a rear axle structure, wheels on the ends of the rear axle structure, side bars between the axle structures, a pair of two row corn planters, means for flexibly engaging the planters with the front axle structure to extend rearwardly therefrom, a pair of shafts having cranks, means for journalling the shafts between the side bars, means for rocking the shafts, and links extending from the cranks of the shafts to the planters so that by rocking said shafts said planters may be raised from the ground, means for dirigibly mounting the wheels on the rear axle structure and means for steering said rear wheels, draft means operatively connected with the front axle structure.

6. In a machine of the class described, a front axle structure, wheels on the front axle structure, a rear axle structure, wheels on the ends of the rear axle structure, side bars between the axle structures, a pair of two row corn planters, means for flexibly engaging the planters with the front axle structure to extend rearwardly therefrom, a pair of shafts having cranks, means for journalling the shafts between the side bars, means for rocking the shafts, and links extending from the cranks of the shafts to the planters so that by rocking said shafts said planters may be raised from the ground, means for dirigibly mounting the wheels on the rear axle structure and means for steering said rear wheels, draft means operatively connected with the front axle structure, means operatively connecting the agitating and tripping mechanisms of the planters.

7. In a machine of the class described, a front axle structure, wheels on the front axle structure, a rear axle structure, wheels on the ends of the rear axle structure, side bars between the axle structures, a pair of two row corn planters, means for flexibly engaging the planters with the front axle structure to extend rearwardly therefrom, a pair of shafts having cranks, means for journalling the shafts between the side bars, means for rocking the shafts, and links extending from the cranks of the shafts to the planters so that by rocking said shafts said planters may be raised from the ground, means for dirigibly mounting the wheels on the rear axle structure and means for steering said rear wheels, draft means operatively connected with the front axle structure, means operatively connecting the agitating and tripping mechanisms of the planters, so that they may be operated from a common check wire.

In testimony whereof I affix my signature.

WILLIAM C. YOUNG.